(12) United States Patent  
Powell et al.

(10) Patent No.: US 8,355,404 B2
(45) Date of Patent: Jan. 15, 2013

(54) METHOD AND SYSTEM FOR AN ASYMMETRIC PHY IN EXTENDED RANGE ETHERNET LANS

(75) Inventors: Scott Powell, Carlsbad, CA (US); Ali Abaye, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 636 days.

(21) Appl. No.: 11/470,515

(22) Filed: Sep. 6, 2006

(65) Prior Publication Data

US 2008/0056284 A1    Mar. 6, 2008

(51) Int. Cl.
H04L 12/28    (2006.01)

(52) U.S. Cl. ................................... 370/395.53

(58) Field of Classification Search .................. None
See application file for complete search history.

(56) References Cited

U.S. PATENT DOCUMENTS

| | | | |
|---|---|---|---|
| 5,790,363 A * | 8/1998 | Chaudhry | 361/119 |
| 6,763,097 B1 * | 7/2004 | Vitenberg | 379/93.31 |
| 6,795,494 B1 * | 9/2004 | Phanse et al. | 375/219 |
| 2001/0004383 A1 * | 6/2001 | Nordstrom et al. | 375/222 |
| 2001/0048667 A1 * | 12/2001 | Hamdi | 370/252 |
| 2003/0091053 A1 | 5/2003 | Tzannes | |
| 2004/0006769 A1 * | 1/2004 | Ansari et al. | 725/74 |
| 2004/0021595 A1 | 2/2004 | Erdogan | |
| 2004/0247022 A1 | 12/2004 | Raghavan | |
| 2005/0033797 A1 * | 2/2005 | Wright et al. | 709/200 |
| 2005/0249203 A1 * | 11/2005 | Huang | 370/389 |
| 2006/0153307 A1 * | 7/2006 | Brown et al. | 375/257 |
| 2007/0081475 A1 * | 4/2007 | Telado et al. | 370/255 |
| 2007/0121663 A1 | 5/2007 | Yousefi et al. | |
| 2007/0248024 A1 * | 10/2007 | Conway et al. | 370/252 |
| 2008/0036558 A1 | 2/2008 | Suarez-Gartner | |

FOREIGN PATENT DOCUMENTS

| | | |
|---|---|---|
| CN | 1640183 A | 7/2005 |
| KR | 20010047484 | 6/2001 |
| KR | 20010074674 | 8/2001 |
| WO | WO 00/02335 | 1/2000 |
| WO | 2005104698 | 11/2005 |

* cited by examiner

Primary Examiner — Yong Zhou
(74) Attorney, Agent, or Firm — Farjami & Farjami LLP

(57) ABSTRACT

Aspects of a method and system for an asymmetric physical (PHY) layer in extended reach Ethernet local area networks (LANs) are provided. Reducing the communication rate provided by an asymmetric Ethernet multi-rate PHY may extend the standard distance over twisted-pair cabling where customer premises equipment (CPE) may be located in the MTU. Downstream and upstream rates may be aggregated evenly or unevenly over each twisted-pair wire in the copper cabling. The asymmetric Ethernet multi-rate PHY may support signal-processing operations, such as echo cancellation and/or equalization, which may be applied to the reduced communication rate to enable range extension. The reduced communication rate may be achieved by reducing the symbol rate provided by the asymmetric Ethernet multi-rate PHY. Reducing the communication rate may also enable utilizing cabling with greater insertion loss than those used for a standard connection distance.

37 Claims, 11 Drawing Sheets

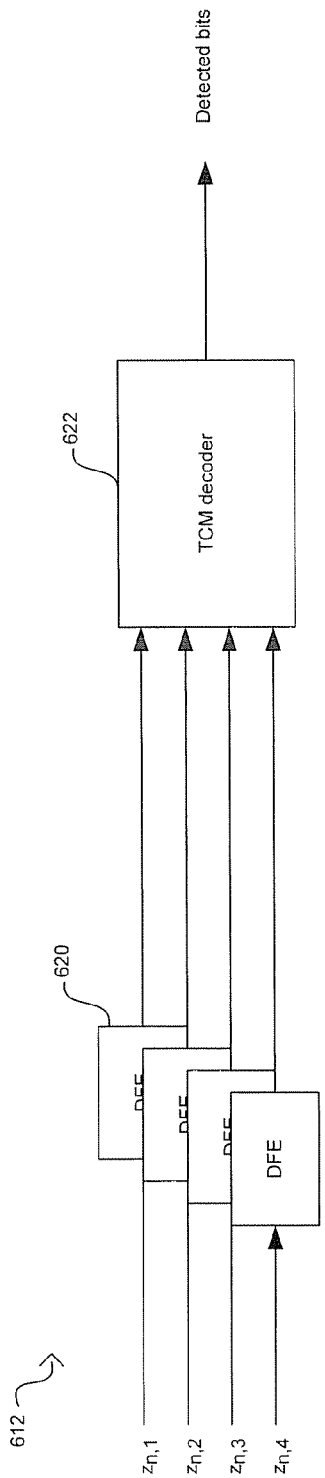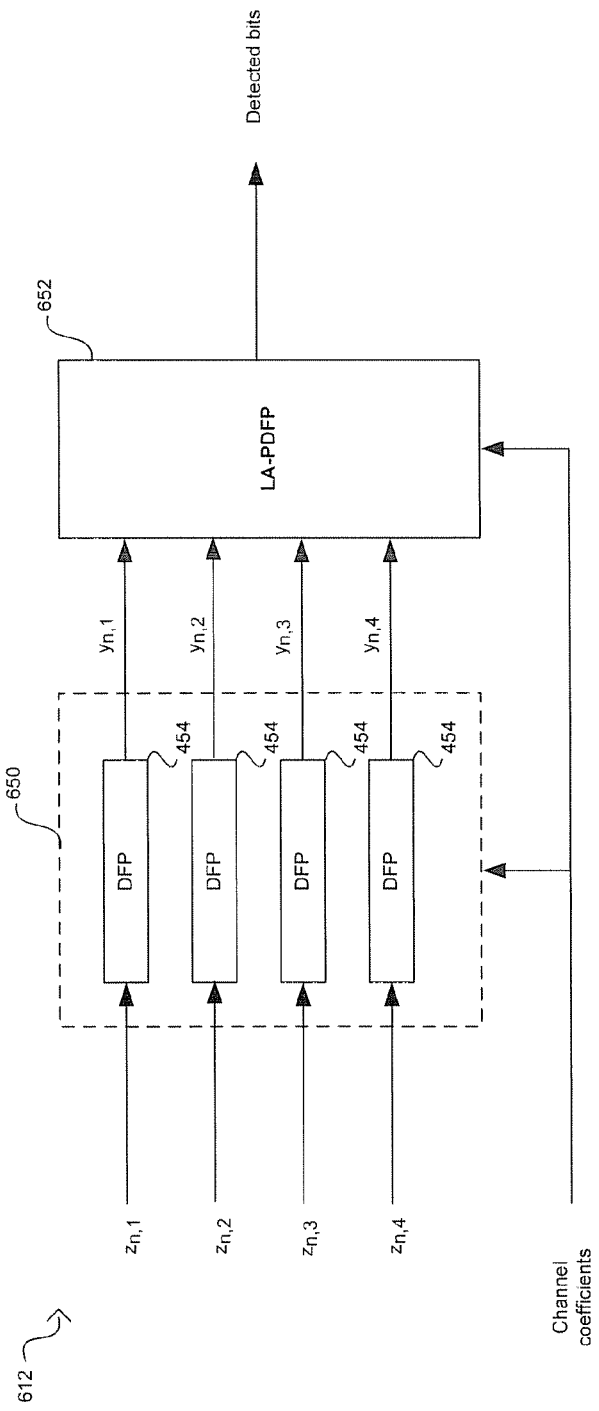
FIG. 6B
FIG. 6C

METHOD AND SYSTEM FOR AN ASYMMETRIC PHY IN EXTENDED RANGE ETHERNET LANS

CROSS-REFERENCE TO RELATED APPLICATIONS/INCORPORATION BY REFERENCE

This patent application makes reference to U.S. patent application Ser. No. 11/473,205 filed on Jun. 22, 2006.

The above stated application is hereby incorporated by reference in its entirety.

FIELD OF THE INVENTION

Certain embodiments of the invention relate to high-speed wired communication. More specifically, certain embodiments of the invention relate to a method and system for an asymmetric PHY in extended reach Ethernet local area networks (LANs).

BACKGROUND OF THE INVENTION

As the number of devices connected to data networks increase and higher data rates are required, there is a growing need for new transmission technologies enabling higher transmission rates over existing copper cabling infrastructures. Various efforts exist in this regard, including technologies that enable transmission rates that may even exceed Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. However, connections longer than 100 m may require either the use of fiber or the placement of Ethernet switches, hubs, and/or repeaters, at mid-points in the connection to keep all cables less than 100 m in length.

Other efforts include the development of a standard for 10 Gigabit-per-second (Gbps) Ethernet transmission over twisted-pair cabling (10 GBASE-T). The emerging 10 GBASE-T PHY specification is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. Although, new cabling specifications are being developed to diminish susceptibility to external electro-magnetic interferences, existing systems can become expensive due to the various signal processing techniques that are employed to reduce the effects listed previously. Even with these techniques, current demand for much greater operating distances still remains unsatisfied.

There may be instances where the data rate required for transmission in one direction may be much higher than the data rate required for transmission in the opposite direction, such as the delivery of interactive video from a central office to the consumer, for example. In this regard, the data rate for the transmission of video in one direction may be much higher than the data rate required for transmitting interactive commands in the opposite direction. Current IEEE 802.3 Ethernet standards define only symmetric links capable of supporting equal data rates in both directions. As a result, a receiver of lower data rates may support higher computational complexity than may be required of a receiver designed to receive a lower data rate.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an asymmetric PHY in extended reach Ethernet local area networks (LANs), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6B is a block diagram illustrating exemplary separate equalization and decoding signal processing operations, in accordance with an embodiment of the invention.

FIG. 6C is a block diagram illustrating exemplary joint equalization and decoding signal processing operations, in accordance with an embodiment of the invention.

DETAILED DESCRIPTION OF THE INVENTION

Certain embodiments of the invention may be found in a method and system for an asymmetric PHY in extended reach Ethernet local area networks (LANs). Certain aspects of the invention may comprise reducing the communication rate provided by an asymmetric Ethernet multi-rate PHY in an Ethernet transceiver to enable extending the standard distance over twisted-pair cabling where customer premises equipment (CPE) may be located in the MTU. Downstream and upstream rates may be aggregated evenly or unevenly over each twisted-pair wire in the copper cabling. The asymmetric Ethernet multi-rate PHY may support signal-processing operations in its higher communication rate operations, such as echo cancellation and/or equalization, which may be applied to the reduced communication rate to enable range extension. The reduced communication rate may be achieved by reducing the symbol rate provided by the asymmetric Ethernet multi-rate PHY. Reducing the communication rate may also enable utilizing cabling with greater insertion loss than those used for a standard connection distance.

Novel PHY devices for Ethernet applications that may enable extending the operational range beyond standard distances may enable cost reduction benefits when utilized and deployed in local area networks in the broadband access market and possibly in new residential and enterprise applications, such as providing central office (CO) services to customer premises equipment (CPE) in multi-tenant units (MTU), for example.

Figure 1:
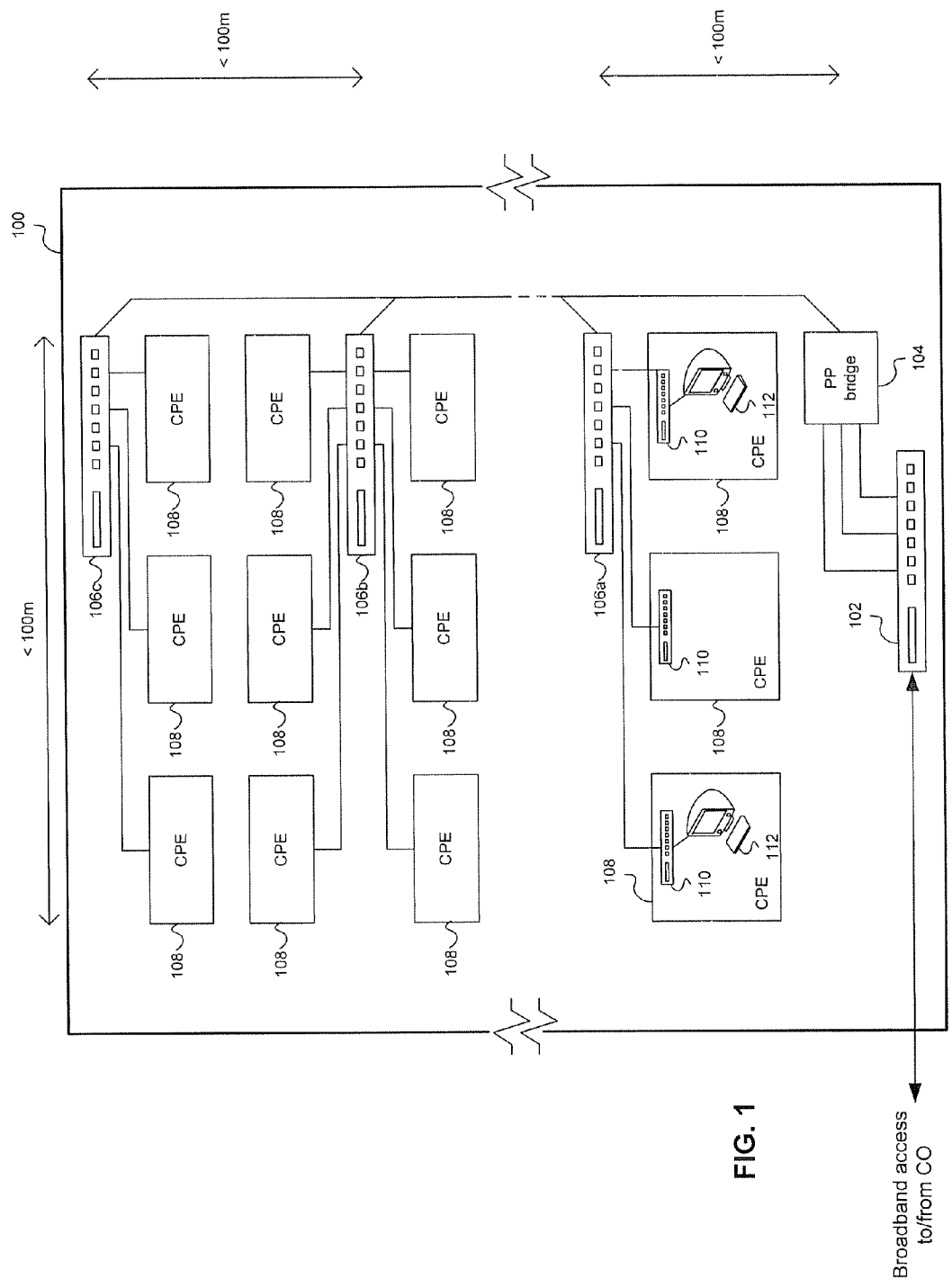
FIG. 1 is a block diagram illustrating an exemplary local area network configuration for a multi-tenant unit (MTU), in connection with an embodiment of the invention.

FIG. 1 is a block diagram illustrating an exemplary local area network configuration for a multi-tenant unit (MTU), in connection with an embodiment of the invention. Referring to FIG. 1, there is shown a local area network configuration in an MTU 100 that may comprise an entry point switch 102, a point-to-point (PP) bridge 104, a plurality of mid-span switch/repeaters 106a, . . . , 106b, and 106c, and a plurality of CPEs 108.

The entry point switch 102 may comprise suitable logic, circuitry, and/or code that may enable communicating data between a central office (CO) and the plurality of CPEs 108 within local area network in the MTU 100. In this regard, the entry point switch 102 may communicate with a central office via an Internet service provider (ISP) by utilizing a broadband access link or connection such as a Gigabit passive optical network (GPON) or an Ethernet passive optical network (EPON), for example. The PP bridge 104 may comprise suitable logic, circuitry, and/or code that may enable data communication between the entry point switch 102 and the plurality of mid-span switch/repeaters 106a, . . . , 106b, and 106c. Each of the plurality of mid-span switch/repeaters 106a, . . . , 106b, and 106c may comprise suitable logic, circuitry, and/or code that may enable data communication between the PP bridge 104 and the plurality of CPEs 108. Each of the plurality of CPEs 108 may comprise suitable logic, circuitry, and/or code that may enable customer equipment associated with the CPE 108, such as computers, for example, to communicate with the central office via the local area network configured within the MTU 100. In this regard, the CPEs 108 may provide the customer with ports to plug in their equipment for communicating with the service provider and/or may also provide the service provider with the ability to monitor the connectivity to the customer site.

In the exemplary embodiment disclosed with respect to FIG. 1, the mid-span switch/repeater 106a may be communicatively coupled to a plurality CPEs 108. Each of the CPEs 108 coupled to the mid-span switch/repeater 106a may comprise a unit switch 110 that may comprise suitable logic, circuitry, and/or code that may enable communication between a user or customer equipment, such as a computer 112, for example, and the mid-span switch/repeater 106a. Notwithstanding the local area network configuration described in FIG. 1, other local area network configurations may be utilized in the MTU 100.

The entry point switch 102, the PP bridge 104, the plurality of mid-span switch/repeaters 106a, . . . , 106b, and 106c, and the plurality of CPEs 108 may be communicatively coupled via four-wire twisted-pair cabling, for example. In this regard, the distance between the entry point switch 102 and one of the plurality of mid-span switch/repeaters 106a, . . . , 106b, and 106c for standard Ethernet applications may generally extend up to approximately 100 meters. Moreover, the distance between a CPE 108 and one of the plurality of mid-span switch/repeaters 106a, . . . , 106b, and 106c for standard Ethernet applications may also generally extend up to approximately 100 meters. Extending the range or distance that may be achieved over twisted-pair cabling for Ethernet applications may enable a local area network configuration within the MTU 100 that enables connecting the entry point switch 102 to a CPE 108 without the need for a mid-span switch/repeater. This approach may result in reduced costs in implementing the local area network configuration within the MTU 100, for example.

In some instances, more data may be transmitted from the central office to a CPE within the MTU 100, which may be referred to as a downstream data traffic direction, than from a CPE to the central office, which may be referred to as a upstream data traffic direction, or from one CPE to another CPE. For example, central office services such as video-on-demand or Internet protocol television (IPTV) may result in an asymmetric data pattern or traffic within a local area network, such as the local area network within the MTU 100. In this regard, a CPE 108 within the MTU 100 may receive high data rate traffic from the entry point switch 102 while the entry point switch 102 may receive low data rate traffic from a CPE 108. In such an instance, it may be possible to utilize a simpler implementation of the entry point switch 102 that utilizes fewer signal processing operations and/or operates at lower speeds in order to reduce the overall cost and/or power consumption of the local area network configuration in the MTU 100.

A simplification of the entry point switch design, such as the entry point switch 102, for example, for asymmetric data traffic may result from the lower complexity in the transmitter portion of a transceiver utilized for data communication over twisted pair copper cabling compared to that of the receiver portion of the transceiver. In this regard, the simpler transmitter portion may handle the high rate data traffic while the more complex receiver portion may handle the lower rate data traffic. Since the high rate data traffic may be handled without adding complexity to the transceiver, a transceiver utilized for asymmetric data traffic applications may result in designs that may achieve reduced integrated circuit area and power consumption when compared to those for symmetric data traffic applications. A simpler transceiver design for an entry point switch may enable a larger number of ports to be integrated into a single integrated circuit, enabling higher port density that may further reduce the cost and/or operation of a local area network within the MTU 100, for example. Standard Ethernet local area networks are generally defined for symmetric data traffic and may not benefit from the asymmetric data traffic of many MTU and enterprise local area network configurations.

Moreover, asymmetric data traffic may also enable the use of different forward error correction (FEC) schemes in the upstream direction than in the downstream direction. Generally, an FEC encoder may be much simpler to implement than the corresponding FEC decoder. When a stronger coding scheme is used in the downstream direction to permit a higher and/or more reliable downstream data rate, most of the complexity of utilizing a stronger coding scheme may be implemented in the decoder in the CPE transceiver. The entry point switch transceiver, which comprises the coding scheme encoder, may remain relatively simple to implement. This also enables a larger number of ports to be integrated onto a single transceiver integrated circuit in the entry point switch to provide higher port density and further reduce the cost of the local area network.

Figure 2:
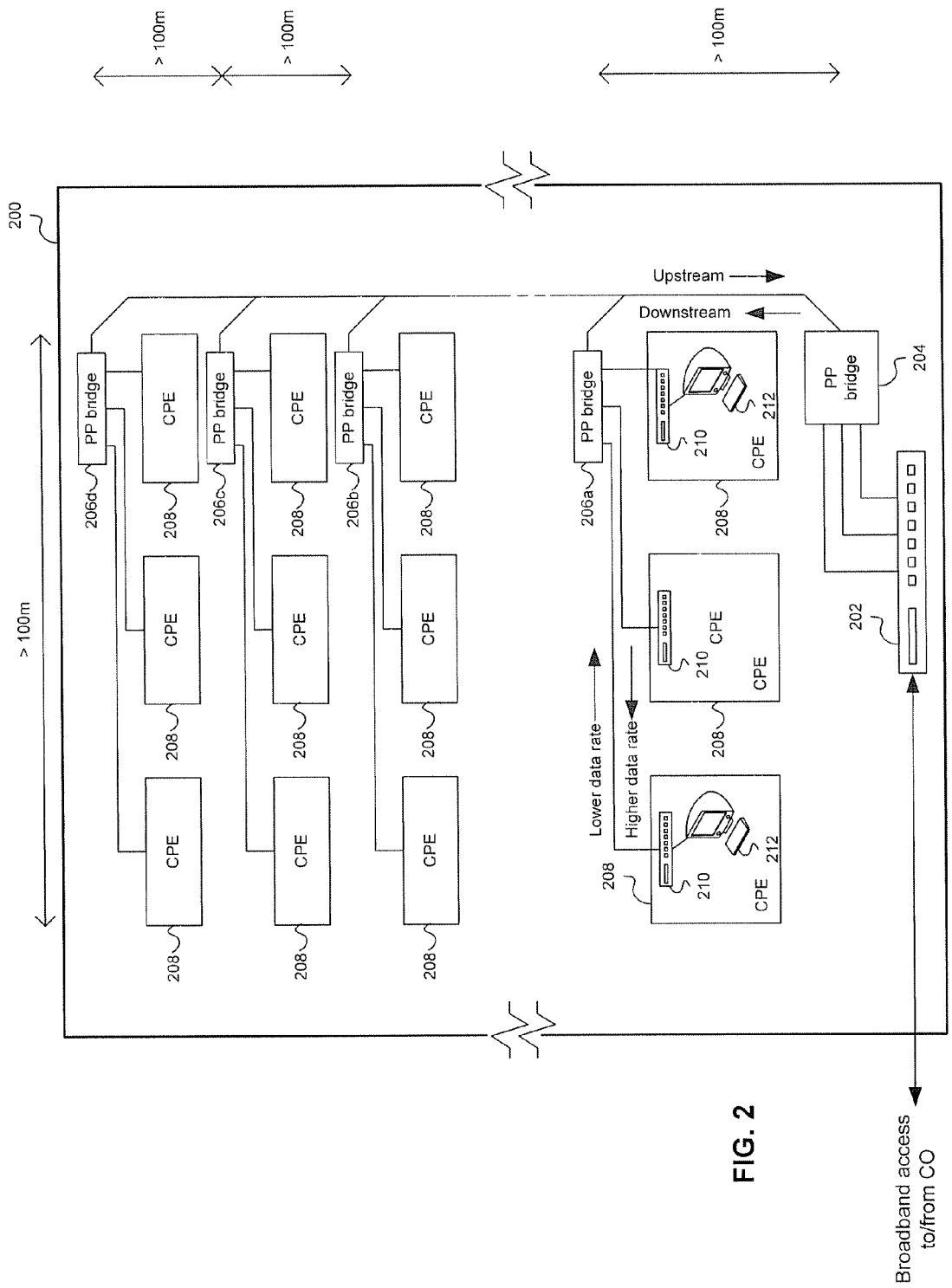
FIG. 2 is a block diagram illustrating an exemplary extended range local area network configuration for an MTU with asymmetric data traffic, in accordance with an embodiment of the invention.

FIG. 2 is a block diagram illustrating an exemplary extended range local area network configuration for an MTU with asymmetric data traffic, in accordance with an embodiment of the invention. Referring to FIG. 2, there is shown a local area network configuration in an MTU 200 that may comprise an entry point switch 202, a point-to-point (PP) bridge 204, a plurality of PP bridges 206a, . . . , 206b, 206c, and 206d, and a plurality of CPEs 208.

The entry point switch 202 may comprise suitable logic, circuitry, and/or code that may enable asymmetrically communicating data between a CO and the plurality of CPEs 208 within local area network in the MTU 200. For example, the downstream data traffic in the direction from the entry point switch 202 to a CPE 208 may be a higher data traffic than the upstream data traffic in the direction from a CPE 208 to the entry point switch 202. Moreover, the entry point switch 202 may enable adjusting multi-rate operations for extending the communication range or distance over four-wire twisted-pair copper cabling. The entry point switch 202 may communicate with a central office via an ISP by utilizing a broadband access link or connection such as a Gigabit passive optical network (GPON) or an Ethernet passive optical network (EPON), for example.

The PP bridge 204 may comprise suitable logic, circuitry, and/or code that may enable asymmetric data communication between the entry point switch 102 and the plurality of PP bridges 206a, . . . , 206b, 206c, and 206d. Each of the plurality of PP bridges 206a, . . . , 206b, 206c, and 206d may comprise suitable logic, circuitry, and/or code that may enable asymmetric data communication between the PP bridge 204 and the plurality of CPEs 208. Each of the plurality of CPEs 208 may comprise suitable logic, circuitry, and/or code that may enable customer equipment associated with the CPE 208, such as computers, for example, to asymmetrically communicate data with the central office via the local area network configured within the MTU 200. In this regard, the CPEs 208 may provide the customer with ports to plug in their equipment for communicating with the service provider and/or may also provide the service provider with the ability to monitor the connectivity to the customer site.

In the exemplary embodiment disclosed with respect to FIG. 2, the PP bridge 206a may be communicatively coupled to a plurality of CPEs 208. Each of the CPEs 108 coupled to the PP bridge 206a may comprise a unit switch 210 that may comprise suitable logic, circuitry, and/or code that may enable asymmetric data communication between a user or customer equipment, such as a computer 212, for example, and the PP bridge 206a. In this regard, the downstream data traffic to the CPE 208 may be higher data rate traffic than the upstream data traffic to the PP bridge 206a.

The entry point switch 202, the PP bridge 204, the plurality of PP bridges 206a, . . . , 206b, 206c, and 206d, and the plurality of CPEs 208 may be communicatively coupled via four-wire twisted-pair cabling, for example. In this regard, the distance between the PP bridge 204 and one of the plurality of CPEs 208 for asymmetric Ethernet applications may extend beyond approximately 100 meters enabling the entry point switch 202 to connect to a CPE 208 without the need for a mid-span switch/repeater, for example.

Figure 3:
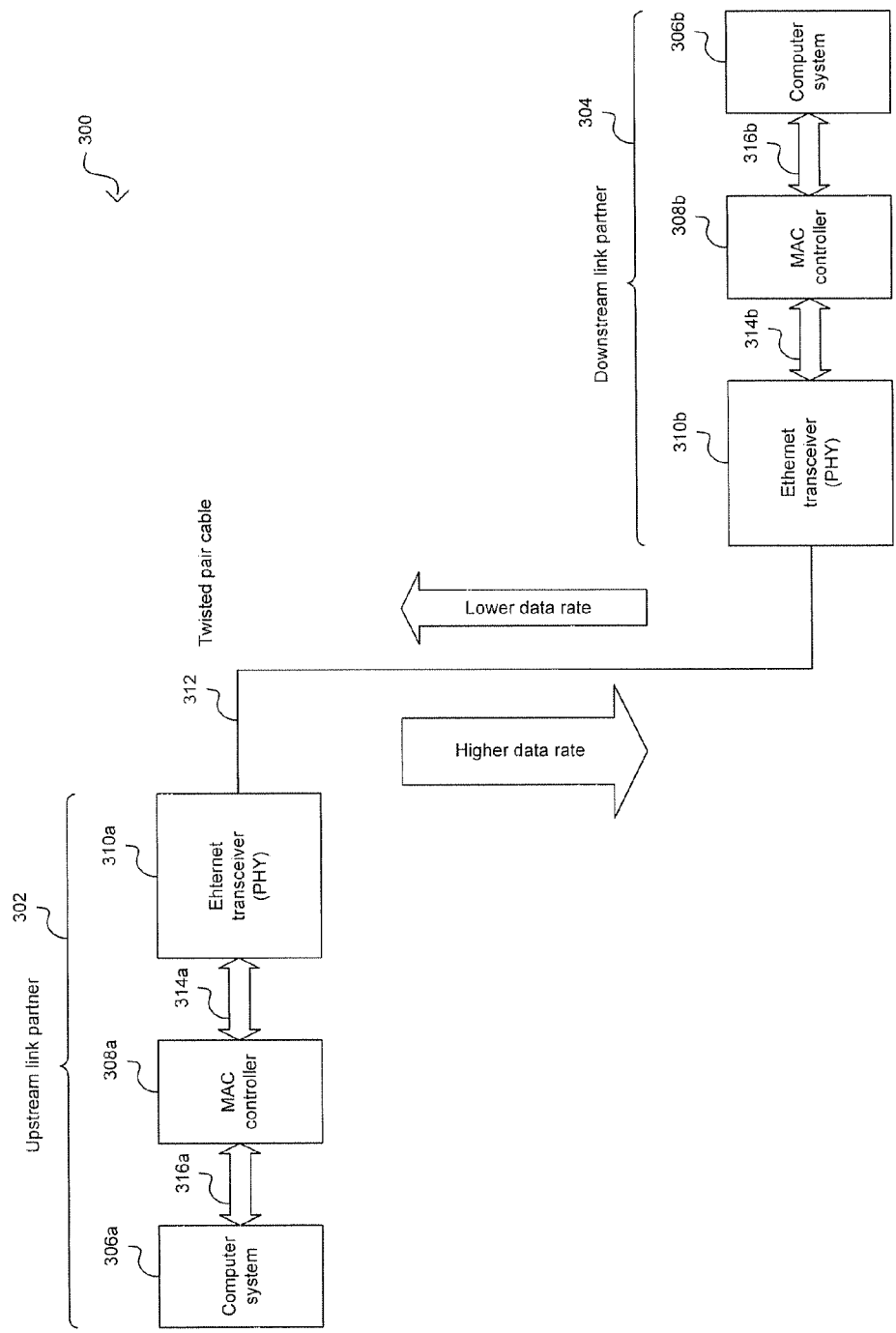
FIG. 3 is a block diagram illustrating an Ethernet system over twisted-pair cabling link between an upstream link partner and a downstream link partner for extended range asymmetric data traffic, in connection with an embodiment of the invention.

FIG. 3 is a block diagram illustrating an Ethernet system over twisted-pair cabling link between an upstream link partner and a downstream link partner for extended range asymmetric data traffic, in connection with an embodiment of the invention. Referring to FIG. 3, there is shown a system 300 that comprises an upstream link partner 302 and a downstream link partner 304. The upstream link partner 302 and the downstream link partner 304 communicate via a cable 312. The cable 312 may be a four-pair unshielded twisted-pair (UTP) copper cabling, for example. Certain performance and/or specifications criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In most instances, a lower category cable may generally have a greater insertion loss than a higher category cable.

The upstream link partner 302 may comprise a computer system 306a, a medium access control (MAC) controller 308a, and a transceiver 304a. The downstream link partner 304 may comprise a computer system 306b, a MAC controller 308b, and a transceiver 310b. Notwithstanding, the invention is not limited in this regard.

The transceiver 310a may comprise suitable logic, circuitry, and/or code that may enable asymmetric Ethernet communication, such as transmission and reception of data, for example, between the upstream link partner 302 and the downstream link partner 304, for example. In this regard, the transceiver 310a may enable transmission at a high data rate to the downstream link partner 304 while also enabling reception at a low data rate from the downstream link partner 304. Similarly, the transceiver 310b may comprise suitable logic, circuitry, and/or code that may enable asymmetric Ethernet communication between the downstream link partner 304 and the upstream link partner 302, for example. In this regard, the transceiver 310b may enable transmission at a low data rate to the upstream link partner 302 while also enabling reception at a high data rate from the upstream link partner 302.

The data transmitted and/or received by the transceivers 310a and 310b may be formatted in a manner that may be compliant with the well-known OSI protocol standard, for example. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. In this regard, the transceiver 310a may enable PHY layer operations that are utilized for asymmetric data communication with the downstream link partner 304. Moreover, the transceiver 310a may enable PHY layer operations that are utilized for asymmetric data communication with the upstream link partner 302.

The transceivers 310a and 310b may enable asymmetric multi-rate communications. In this regard, the data rate in the upstream and/or the downstream direction may be <10 Mbps, 10 Mbps, 100 Mbps, 1000 Mbps (or 1 Gbps) and/or 10 Gbps, for example. The transceivers 310a and 310b may support standard-based asymmetric data rates and/or non-standard asymmetric data rates. The transceivers 310a and 310b may utilize multilevel signaling in their operation. In this regard, the transceivers 310a and 310b may utilize pulse amplitude modulation (PAM) with various levels to represent the various symbols to be transmitted. For example, for 1000 Mbps Ethernet applications, a PAM5 transmission scheme may be utilized in each twisted-pair wire, where PAM5 refers to PAM with five levels {−2, −1, 0, 1, 2}.

In the embodiment of the invention illustrated in FIG. 3, the computer systems 306a and 306b may represent layer 3 and above, the MAC controllers 308a and 308b may represent layer 2 and above and the transceivers 310a and 310b may represent the operability and/or functionality of layer 1 or the PHY layer. In this regard, the computer systems 306a and 306b comprise suitable logic, circuitry, and/or code that may enable operability and/or functionality of the five highest functional layers for data packets that are to be transmitted over the cable 312. Since each layer in the OSI model provides a service to the immediately higher interfacing layer, the MAC controllers 308a and 308b may provide the necessary services to the computer systems 306a and 306b to ensure that packets are suitably formatted and communicated to the transceivers 310a and 310b. During transmission, each layer adds its own header to the data passed on from the interfacing layer above it. However, during reception, a compatible device having a similar OSI stack strips off the headers as the message passes from the lower layers up to the higher layers.

The transceivers 310a and 310b may be configured to handle all the physical layer requirements, which include, but are not limited to, packetization, data transfer and serialization/deserialization (SERDES), in instances where such an operation is required. Data packets received by the transceivers 310a and 310b from MAC controllers 308a and 308b, respectively, may include data and header information for each of the above six functional layers. The transceivers 310a and 310b may be configured to encode data packets that are to be transmitted over the cable 312 and/or to decode data packets received from the cable 312.

The MAC controller 308a may comprise suitable logic, circuitry, and/or code that may enable handling of data link layer, layer 2, operability and/or functionality in the upstream link partner 302. Similarly, the MAC controller 308b may comprise suitable logic, circuitry, and/or code that may enable handling of layer 2 operability and/or functionality in the downstream link partner 304. The MAC controllers 308a and 308b may be configured to implement Ethernet protocols, such as those based on the IEEE 802.3 standard, for example. Notwithstanding, the invention is not limited in this regard.

The MAC controller 308a may communicate with the transceiver 310a via an interface 314a and with the computer system 306a via a bus controller interface 316a. The MAC controller 308b may communicate with the transceiver 310b via an interface 314b and with the computer system 306b via a bus controller interface 316b. The interfaces 314a and 314b correspond to Ethernet interfaces that comprise protocol and/or link management control signals. The interfaces 314a and 314b may be multi-rate interfaces. The bus controller interfaces 316a and 316b may correspond to PCI Peripheral Component Interconnect (PCI) or PCI-X interfaces. Notwithstanding, the invention is not limited in this regard.

Figure 4:
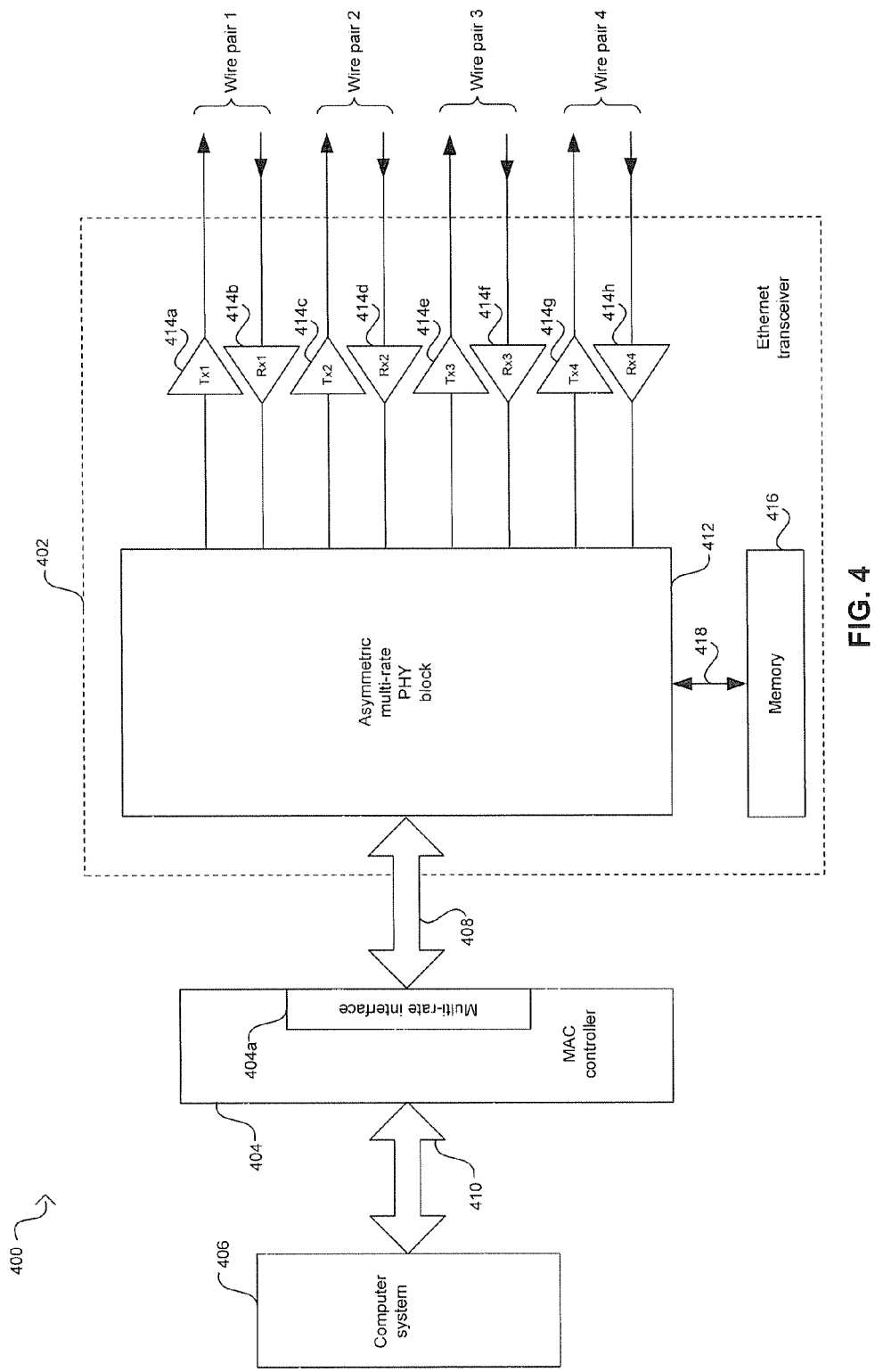
FIG. 4 is a block diagram illustrating an exemplary Ethernet transceiver architecture comprising an asymmetric multi-rate PHY, in accordance with an embodiment of the invention.

FIG. 4 is a block diagram illustrating an exemplary Ethernet transceiver architecture comprising an asymmetric multi-rate PHY, in accordance with an embodiment of the invention. Referring to FIG. 4, there is shown a link partner 400 that may comprise a transceiver 402, a MAC controller 404, a computer system 406, an interface 408, and a bus controller interface 410.

The transceiver 402 may be an integrated device that comprises an asymmetric multi-rate PHY block 412, a plurality of transmitters 414a, 414c, 414e, and 414g, a plurality of receivers 414b, 414d, 414f, and 414h, a memory 416, and a memory interface 418. The operation of the transceiver 402 may be the same as or substantially similar to the transceivers 310a and 310b as described in FIG. 3. For example, when the transceiver 402 is utilized in an upstream link partner, the transceiver 402 may enable a high rate for data transmission and a low rate for data reception In another example, when the transceiver 402 is utilized in a downstream link partner, the transceiver 402 may enable a low rate for data transmission and a high rate for data reception. In this regard, the transceiver 402 may provide layer 1 or PHY layer operability and/or functionality that enables asymmetric data traffic.

Similarly, the operation of the MAC controller 404, the computer system 406, the interface 408, and the bus controller 410 may be the same as or substantially similar to the respective MAC controllers 308a and 308b, computer systems 306a and 306b, interfaces 314a and 314b, and bus controller interfaces 316a and 316b as disclosed in FIG. 3. In this regard, the MAC controller 404, the computer system 406, the interface 408, and the bus controller 410 may enable different data transmission and/or data reception rates when implemented in an upstream link partner or a downstream link partner. The MAC controller 404 may comprise a multi-rate interface 404a that may comprise suitable logic, circuitry, and/or code to enable communication with the transceiver 402 at a plurality of data rates via the interface 408.

The asymmetric multi-rate PHY block 412 in the transceiver 402 may comprise suitable logic, circuitry, and/or code that may enable operability and/or functionality of PHY layer requirements for asymmetric data traffic. The asymmetric multi-rate PHY block 412 may communicate with the MAC controller 404 via the interface 408. In one aspect of the invention, the interface 408 may be configured to utilize a plurality of serial data lanes for receiving data from the asymmetric multi-rate PHY block 412 and/or for transmitting data to the asymmetric multi-rate PHY block 412, in order to achieve higher operational speeds such as Gbps or 10 Gbps, for example. The asymmetric multi-rate PHY block 412 may be configured to operate in one or more of a plurality of communication modes, where each communication mode implements a different communication protocol. These communication modes may include, but are not limited to, IEEE 802.3, 10 GBASE-T, other similar protocols and/or non-standard communication protocols that enable asymmetric data traffic. The asymmetric multi-rate PHY block 412 may be configured to operate in a particular mode of operation upon initialization or during operation. The asymmetric multi-rate PHY block 412 may also be configured to operate in an extended range mode.

In some instances, an auto-negotiation scheme may be utilized by the transceiver 402 to indicate or communicate to a remote link partner that the transceiver 402 is operating in an extended range mode. The remote link partner may then configure itself to the appropriate extended range mode. Through auto-negotiation, a network link may be configured as an extended range from only one end of the link, ensuring interoperability between extended range enabled Ethernet transceivers and legacy devices. In some instances, the link may be pre-configured and the transceivers fixed in an extended range mode.

The asymmetric multi-rate PHY block 412 may be coupled to memory 416 through the memory interface 418, which may be implemented as a serial interface or a bus. The memory 416 may comprise suitable logic, circuitry, and/or code that may enable storage or programming of information that includes parameters and/or code that may effectuate the operation of the asymmetric multi-rate PHY block 412. The parameters may comprise configuration data and the code may comprise operational code, such as software and/or firmware, but the information need not be limited in this regard. Moreover, the parameters may include adaptive filter and/or block coefficients for use by the asymmetric multi-rate PHY block 412, for example.

The transmitters 414a, 414c, 414e, and 414g may comprise suitable logic, circuitry, and/or code that may enable transmission of data from a transmitting link partner to a remote link partner via the cable 312 in FIG. 3, for example. In this regard, when the transmitting link partner is an upstream link partner, the transmitters 414a, 414c, 414e, and 414g may operate at a higher data rate than the data rate received from the downstream link partner. Similarly, when the when the transmitting link partner is a downstream link partner, the transmitters 414a, 414c, 414e, and 414g may operate at a lower data rate than the data rate received from the upstream link partner.

The receivers 414b, 414d, 414f, and 414h may comprise suitable logic, circuitry, and/or code that may enable receiving data from a remote link partner by a receiving link partner via the cable 312, for example. In this regard, when the receiving link partner is an upstream link partner, the receivers 414b, 414d, 414f, and 414h may operate at a lower data rate than the data rate transmitted to the downstream link partner. Similarly, when the receiving link partner is a downstream link partner, the receivers 414b, 414d, 414f, and 414h may operate at a higher data rate than the data rate transmitted to the upstream link partner.

Each of the four pairs of transmitters and receivers in the transceiver 402 may correspond to one of the four wires in the cable 312. For example, transmitter 414a and receiver 414b may be utilized to asymmetrically communicate data with a remote link partner via the first wire pair in the cable 312. Similarly, transmitter 414g and receiver 414h may be utilized to asymmetrically communicate data with a remote link partner via the fourth wire pair in the cable 312. In this regard, at least one of the four transmitter/receiver pairs may be enabled to provide the appropriate communication rate. The above-disclosed scheme may be applied to fewer, or greater, number of wires, for example.

Figure 5:
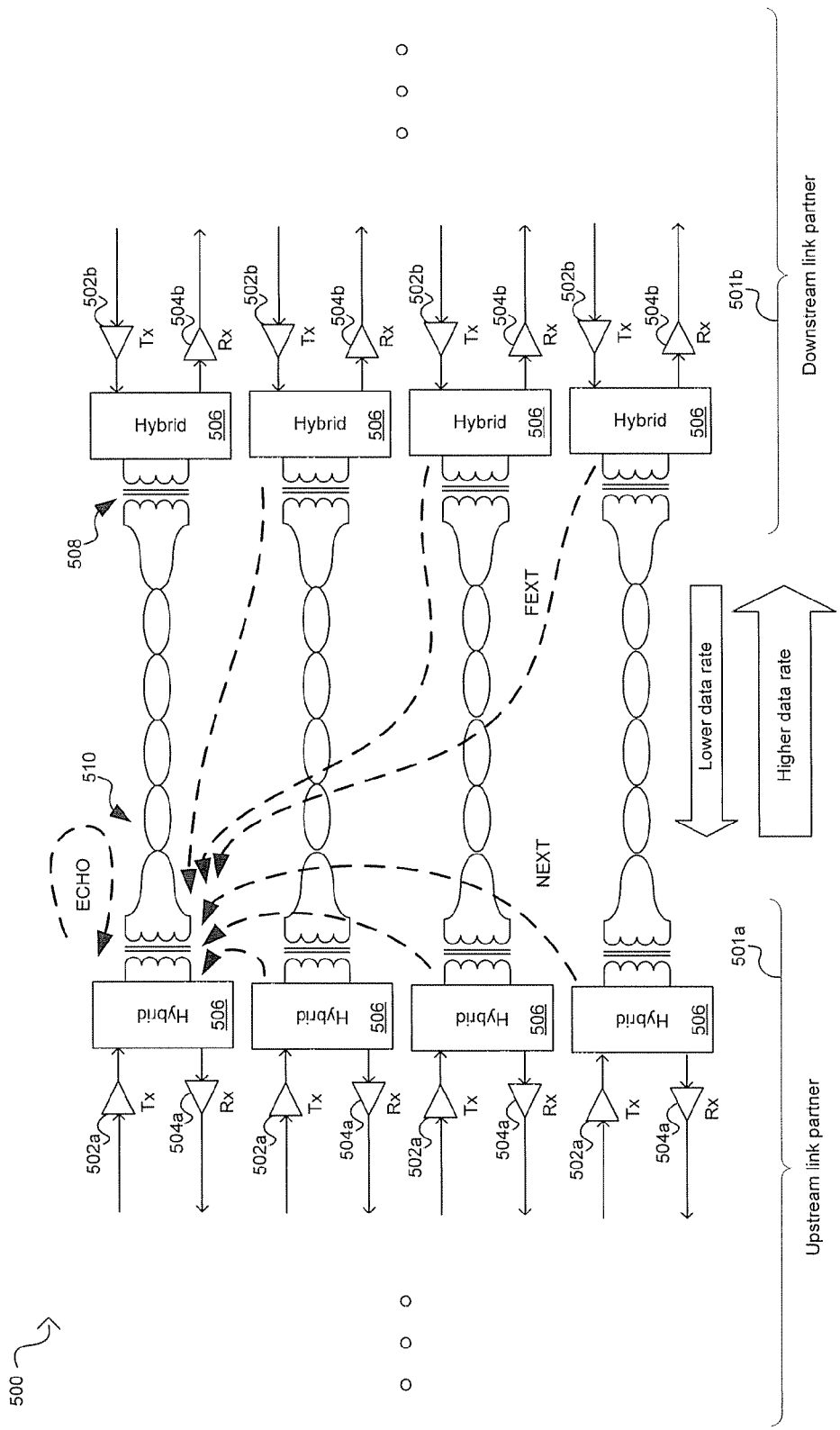
FIG. 5 is a block diagram illustrating ECHO, NEXT, and FEXT channel conditions in an Ethernet system, in accordance with an embodiment of the invention.

FIG. 5 is a block diagram illustrating ECHO, NEXT, and FEXT channel conditions in an Ethernet system, in accordance with an embodiment of the invention. Referring to FIG. 5, there is shown an asymmetric Ethernet system 500 that may comprise an upstream link partner 501a and a downstream link partner 501b. The upstream link partner 501a and the downstream link partner 501b may asymmetrically communicate data via four twisted-pair wires 510 in full duplex operation. Each of the four twisted-pair wires 510 may support a portion of the data rates that may be necessary to provide the aggregate upstream and downstream data traffic. In this regard, each of the four twisted-pair wires 510 may support an equal or even or an unequal or uneven portion of the aggregate upstream and downstream data traffic.

The upstream link partner 501a may comprise four hybrids 506. Each hybrid 506 in the upstream link partner 501a may be communicatively coupled to a transmitter 502a, a receiver 504a, and to one of the four twisted-pair wires 510. Similarly, the downstream link partner 501b may comprise four hybrids 506. Each hybrid 506 in the downstream link partner 501b may be communicatively coupled to a transmitter 502b, a receiver 504b, and to one of the four twisted-pair wires 510. The portions of the upstream link partner 501a and the downstream link partner 501b shown in FIG. 5 may correspond to a portion of the physical (PHY) layer operations supported by the upstream link partner 501a and by the downstream link partner 501b respectively.

Each hybrid 506 in the upstream link partner 501a or in the downstream link partner 501b may be communicatively coupled to or comprise a transformer 508. The hybrid 506 may comprise suitable logic, circuitry, and/or code that may enable separating the transmitted and received signals from a twisted-pair wire 510. The transmitters 502a and 502b may comprise suitable logic, circuitry, and/or code that may enable generating signals to be transmitted to a link partner at the other end of the link via a hybrid 506 and a twisted-pair wire 510. In this regard, the transmitters 502a may operate at a higher data rate than the transmitters 502b. The receivers 304 may comprise suitable logic, circuitry, and/or code that may enable processing signals received from a link partner at the other end of the link via a twisted-pair wire 510 and a hybrid 506. In this regard, the receivers 504a may operate at a lower data rate than the receivers 504b.

During operation, several conditions may occur in each of the twisted-pair wires 510. For example, intersymbol interference (ISI) may occur as a result of frequency dependent wire attenuation. As shown in FIG. 5, an ECHO component may be received in a twisted-pair wire 510 from an echo that results from the transmitter 502a in the upstream link partner 501a on the same twisted-pair wire 510. A near-end crosstalk (NEXT) component may also be received in a twisted-pair wire 510 from the local transmitters 502a corresponding to the three adjacent twisted-pair wires 510 in the upstream link partner 501a. Moreover, a far-end crosstalk (FEXT) component may also be received in a twisted-pair wire 510 from the transmitters 502b in the downstream link partner 501b at the other end of the link. Similar conditions may also occur in the downstream link partner 501b, for example.

Figure 6A:
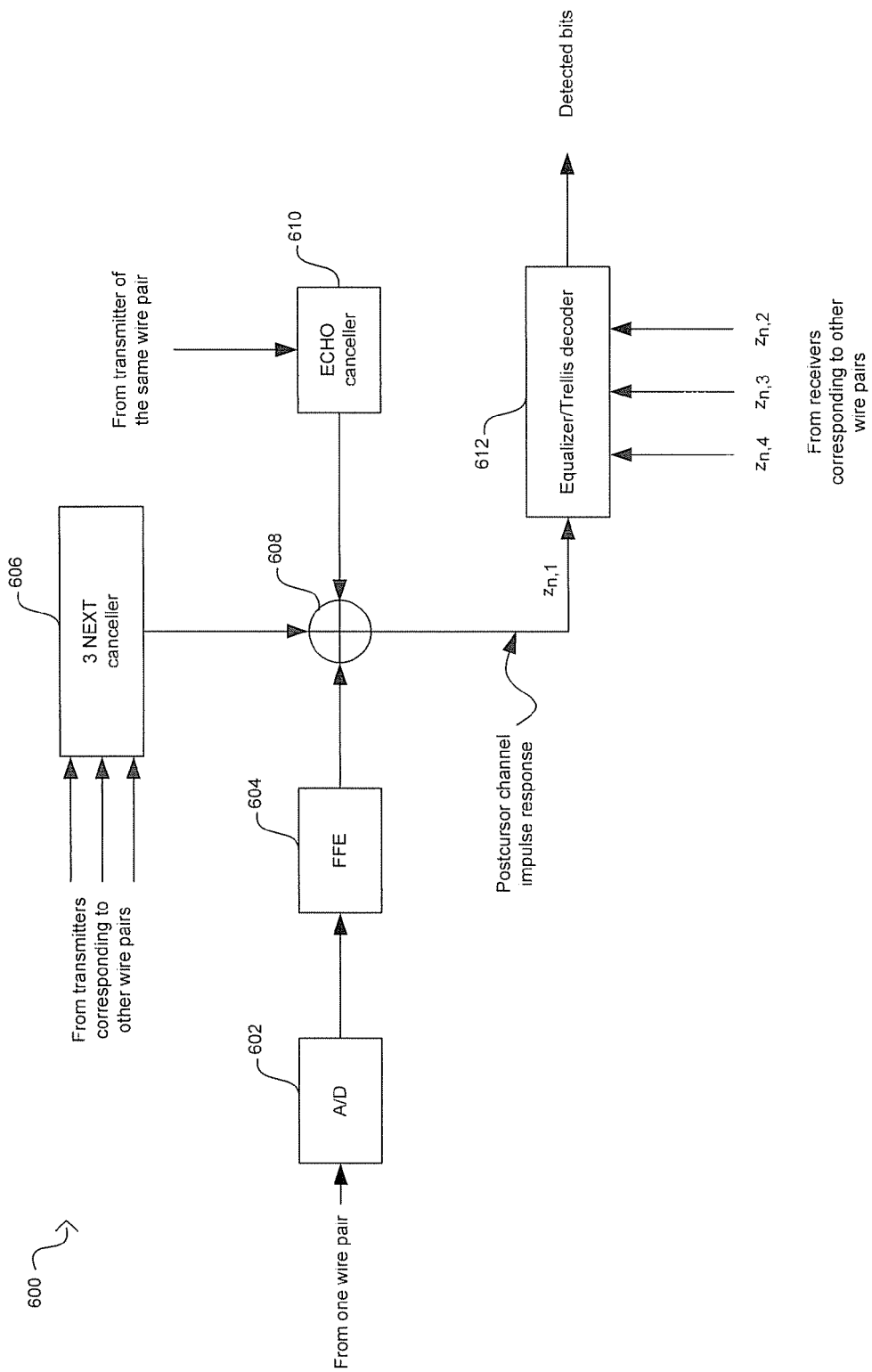
FIG. 6A is a block diagram illustrating exemplary Gigabit signal processing operations for received signals in an Ethernet system utilized for asymmetric data traffic, in accordance with an embodiment of the invention.

FIG. 6A is a block diagram illustrating exemplary Gigabit signal processing operations for received signals in an Ethernet system utilized for asymmetric data traffic, in accordance with an embodiment of the invention. Referring to FIG. 6A, there is shown a signal processing system 600 that may provide a portion of the signal processing performed by the physical (PHY) layer operations in an Ethernet transceiver that supports asymmetric multi-rate operation. For example, the signal processing system 600 may be implemented in the asymmetric multi-rate PHY block 412 and/or in the receivers 414b, 414d, 414f, and 414h in FIG. 4. The signal processing system 600 may comprise an analog-to-digital converter (A/D) 602, an adaptive feed-forward equalizer (FFE) 604, a 3 NEXT canceller 606, an adder 608, an ECHO canceller 610, and an equalizer/trellis decoder 612.

The A/D 602 may comprise suitable logic, circuitry, and/or code that may enable converting analog signals received via a twisted-pair wire into digital signals. The output of the A/D 602 may be communicated to the FFE 604. The FFE 604 may comprise suitable logic, circuitry, and/or code that may enable removal of precursor ISI to make the channel minimum-phase and to whiten the noise in the channel. The 3 NEXT canceller 606 may comprise suitable logic, circuitry, and/or code that may enable canceling at least a portion of the NEXT component received in the twisted-pair wire from the local transmitters corresponding to the three adjacent twisted-pair wires. The ECHO canceller 610 may comprise suitable logic, circuitry, and/or code that may enable canceling at least a portion of the ECHO component received in the twisted-pair wire from the local transmitter on the same twisted-pair wire.

The adder 608 may comprise suitable logic, circuitry, and/or code that may enable adding the output of the FFE 604, the 3 NEXT canceller 606, and/or the ECHO canceller to generate a postcursor channel impulse response, $z_{n,1}$. The equalizer/trellis decoder 612 may comprise suitable logic, circuitry and/or code that may enable equalizing the ISI that may result from the postcursor impulse response and decoding the trellis code. The equalizer/trellis decoder 612 may receive as inputs the postcursor channel impulse responses, $z_{n,2}$, $z_{n,3}$, and $z_{n,4}$ the corresponding to the other twisted-pair wires. The equalizer/trellis decoder 612 may generate the detected bits that correspond to the received analog signal.

FIG. 6B is a block diagram illustrating exemplary separate equalization and decoding signal processing operations, in accordance with an embodiment of the invention. Referring to FIG. 6B, there is shown the equalizer/trellis decoder 612 as described in FIG. 6A that may be implemented as separate equalization and trellis decoding operations. The equalizer/trellis decoder 612 may comprise four decision-feedback equalizers (DFE) 620 and a trellis-coded modulation (TCM) decoder 622. The DFE 620 may comprise suitable logic, circuitry, and/or code that may enable removing the postcursor ISI for each twisted-pair wire. The TCM decoder 622 may comprise suitable logic, circuitry, and/or code that may enable executing a Viterbi algorithm on the code trellis to decode the trellis-coded symbols. The TCM decoder 622 may be implemented using a parallel decision-feedback decoding architecture, for example. The separate equalization and trellis decoding approach may provide low implementation complexity and higher data rates, such as Gbps, for example, may be easily achieved.

FIG. 6C is a block diagram illustrating exemplary joint equalization and decoding signal processing operations, in accordance with an embodiment of the invention. Referring to FIG. 6C, there is shown the equalizer/trellis decoder 612 as described in FIG. 6A that may be implemented as joint equalization and trellis decoding operations. The equalizer/trellis decoder 612 may comprise a decision-feedback prefilter (DFP) block 650 and a look-ahead parallel decision-feedback decoder (LA-PDFD) 652. The DFP block 650 may comprise four DFPs 654, one for each twisted-pair wire. The DFP 654 may comprise suitable logic, circuitry, and/or code that may enable shortening the postcursor channel memory. The LA-PDFP 652 may comprise suitable logic, circuitry, and/or code that may enable computing branch metrics in a look-ahead fashion. The training and adaptation of the channel coefficients may be utilized to improve the performance of the equalizer/trellis decoder 612.

Figure 7:
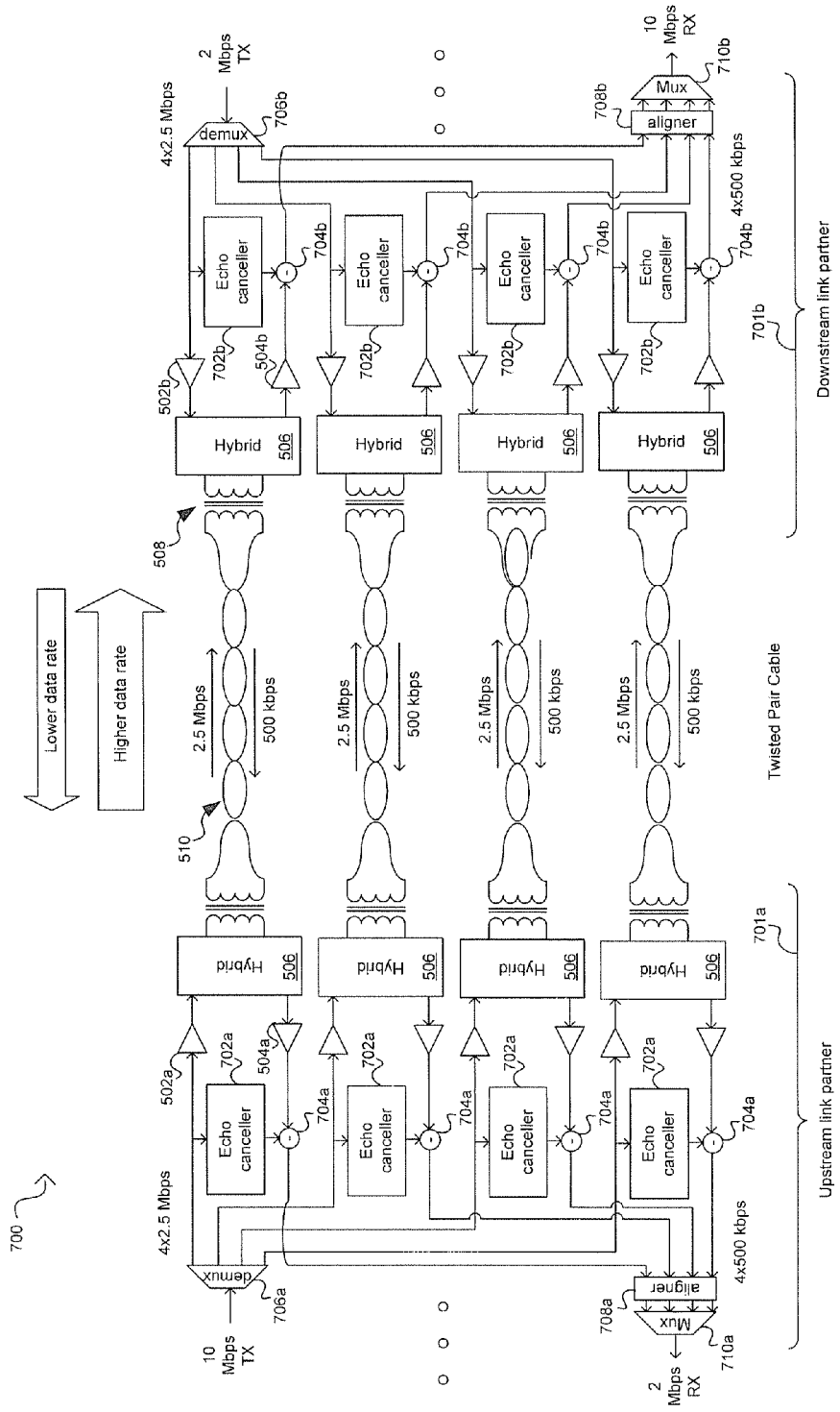
FIG. 7 is a block diagram of a multi-rate Ethernet system for asymmetric data traffic that utilizes Gigabit signal processing resources in a four-pair extended range mode, in accordance with an embodiment of the invention.

FIG. 7 is a block diagram of a multi-rate Ethernet system for asymmetric data traffic that utilizes Gigabit signal processing resources in a four-pair extended range mode, in accordance with an embodiment of the invention. Referring to FIG. 7, there is shown an asymmetric multi-rate Ethernet system 700 that may comprise an upstream link partner 701a and a downstream link partner 701b. The upstream link partner 701a may correspond to, for example, the entry point switch 202 in FIG. 2, while the downstream link partner 701b may correspond to, for example, a CPE 20. The asymmetric multi-rate Ethernet system 700 may support a plurality of asymmetric data rates or modes of operation over four-pair twisted-pair wire, including the ability to provide 1 Gbps or 10 Gbps, for example. In the embodiment of the invention disclosed with respect to FIG. 7, the asymmetric multi-rate Ethernet system 700 may operate in an extended range mode of operation that provides 10 Mbps in the downstream direction and 2 Mbps in the upstream direction, for example. In this regard, the extended range operation may be achieved by utilizing the 2 Mbps and 10 Mbps lower communication data rates, that is, data rates below the 1 Gbps or 10 Gbps that may be achieved by the signal processing operations enabled in either the upstream link partner 701a or the downstream link partner 701b.

The upstream link partner 701a may comprise four hybrids 506 as described in FIG. 5. Notwithstanding, the invention is not so limited and may support various implementations of a hybrid circuitry. Each hybrid 506 in the upstream link partner 701a may be communicatively coupled to a transmitter 502a, a receiver 504a, and to one of the four twisted-pair wires 510 also as described in FIG. 5. Associated with each hybrid 506 in the upstream link partner 701a may also be an echo canceller 702a and a subtractor 704a. The upstream link partner 701a may also comprise a demultiplexer (demux) 706a, an aligner 708a, and a multiplexer (mux) 710a.

Similarly, the downstream link partner 701b may comprise four hybrids 506. Each hybrid 506 in the downstream link partner 701b may be communicatively coupled to a transmitter 502b, a receiver 504b, and to one of the four twisted-pair wires 510 as described in FIG. 5. Associated with each hybrid 506 in the downstream link partner 701b are also an echo canceller 504b and a subtractor 506b. The remote link partner 701b may also comprise a demux 706b, an aligner 708b, and a mux 710b. The portions of the upstream link partner 701a and downstream link partner 701b shown in FIG. 7 may correspond to a portion of the physical (PHY) layer operations supported by the upstream link partner 701a and downstream link partner 701b respectively.

The demux 706a may comprise suitable logic, circuitry, and/or code that may enable separating an exemplary 10 Mbps dowsnteam signal into four 2.5 Mbps signals for transmission over the four twisted-pair wires. Similarly, the demux 706b may comprise suitable logic, circuitry, and/or code that may enable separating an exemplary 2 Mbps upstream signal into four 500 kbps signals for transmission over the four twisted-pair wires. The aligner 708a may comprise suitable logic, circuitry, and/or code that may enable aligning the 500 kbps signals received from each of the four twisted-pair wires by the upstream link partner 701a Similarly, the aligner 708b may comprise suitable logic, circuitry, and/or code that may enable aligning the 2.5 Mbps signals received from each of the four twisted-pair wires by the downstream link partner 701b. The mux 710a may comprise suitable logic, circuitry, and/or code that may enable combining the aligned 500 kbps signals from the aligner 708a to generate the received 2 Mbps upstream signal. Similarly, the mux 710b may comprise suitable logic, circuitry, and/or code that may enable combining the aligned 2.5 Mbps signals from the aligner 708a to generate the received 10 Mbps downstream signal.

The echo cancellers 702a and 702b may comprise suitable logic, circuitry, and/or code that may enable at least partial cancellation of the ECHO component in the corresponding signal received via the receivers 504a and 504b, respectively, associated with the same twisted-pair wire. The subtractors 704a and 704b may comprise suitable logic, circuitry, and/or code that may enable cancellation of the ECHO component from the received signal.

In operation, the upstream link partner 701a may separate a 10 Mbps signal to be transmitted into four 2.5 Mbps signals via the demux 706a. Each signal to be transmitted is processed by a transmitter 502a before being communicated to the corresponding twisted-pair wire via a hybrid 506. The four transmitted signals may arrive at the downstream link partner 701b, where each of the signals may be processed by a receiver 504b before echo cancellation occurs from the operation of a corresponding echo canceller 702b and subtractor 704b. The four received 2.5 Mbps signals may be aligned in the aligner 708b before being combined in the mux 710b into a 10 Mbps received downstream signal.

Similarly, the downstream link partner 701b may separate a 2 Mbps signal to be transmitted into four 500 kbps signals via the demux 706b. Each signal to be transmitted may be processed by a transmitter 502b before being communicated to the corresponding twisted-pair wire via a hybrid 506. The four transmitted signals may arrive at the upstream link partner 701a, where each of the signals may be processed by a receiver 504a before echo cancellation occurs from the operation of a corresponding echo canceller 702a and subtractor 704a. The four received 500 kbps signals may be aligned in the aligner 708a before being combined in the mux 710a into a 2 Mbps received upstream signal.

The upstream link partner 701a and the downstream link partner 701b may communicate via all four twisted-pair wires 510 in full duplex operation to provide an aggregate of 2 Mbps for the upstream data rate and 10 Mbps for the downstream data rate. Reducing the communication rate to 2 Mbps and 10 Mbps from, for example, 100 Mbps or higher, while utilizing the higher communication rate PHY layer signal processing operations, may enable extending the range, that is, extending the standard length, of the twisted-pair wires 510. In this regard, the asymmetric multi-rate operations of the upstream link partner 701a and a downstream link partner 701b may support Gigabit PHY layer operations that may utilize multi-level signaling to transmit multiple bits per clock interval. PAM-5 may be used to transmit 2 bits per symbol and reduce the symbol rate to carry on each twisted-pair wire 510. In this regard, multi-level signaling may be applied at 100 Mbps, 10 Mbps, or <10 Mbps rates, that is, at lower communication rates, to permit operation at reduced symbol rates. For example, 25 Mbps may be carried on a single twisted-pair wire at a 12.5 Msps symbol rate. Reducing the symbol rate enables transmission over longer cable ranges. The signal processing operations available in a Gigabit PHY layer may support 2, 3, 4, or 5 levels of signaling with no increase in complexity, for example.

Reducing the communication rate may also enable utilizing cabling with higher insertion loss while maintaining the same standard length. For example, for Gigabit operations, a Category 5 cable may be utilized. Reducing the communication rate in one direction in the asymmetric data traffic to 100 Mbps, for example, may enable utilizing cabling with higher insertion loss than a Category 5 cabling while maintaining the 100 m length requirement under the IEEE 802.3 standard. The insertion loss of a twisted-pair wire cable increases as the square root of frequency. Insertion loss, in dB, is directly proportional to cable length. Applying Gigabit signal processing operation at 100 Mbps data rate may increase the cable range. NEXT cancellation operations also improve the SNR of each received signal and may be applied at 100 Mbps and 10 Mbps rates to achieve similar improvements in SNR and further extend the cable range at those reduced communication rates.

The asymmetric multi-rate Ethernet system 700 need not be limited to achieving a lower communication rate in any one direction by evenly distributing the data rate over each of the four twisted-pair wires utilized. In another embodiment of the invention, the asymmetric multi-rate Ethernet system 700 may achieve a lower communication rate by distributing the data rate unevenly over each of the four twisted-pair wires utilized. For example, for a 10 Mbps downstream data rate, the first twisted-pair wire may support 1 Mbps, the second twisted-pair wire may support 2 Mbps, the third twisted-pair wire may support 3 Mbps, and the fourth twisted-pair wire may support 4 Mbps, to achieve an aggregate of 10 Mbps. A similar approach may be followed for generating an aggregate upstream data rate from unevenly distributed data rates over each of the four twisted-pair wires utilized. In this regard, the components in the upstream link partner 701a and/or the downstream link partner 701b may be adapted to handle an unevenly distributed lower communication rate.

Figure 8:
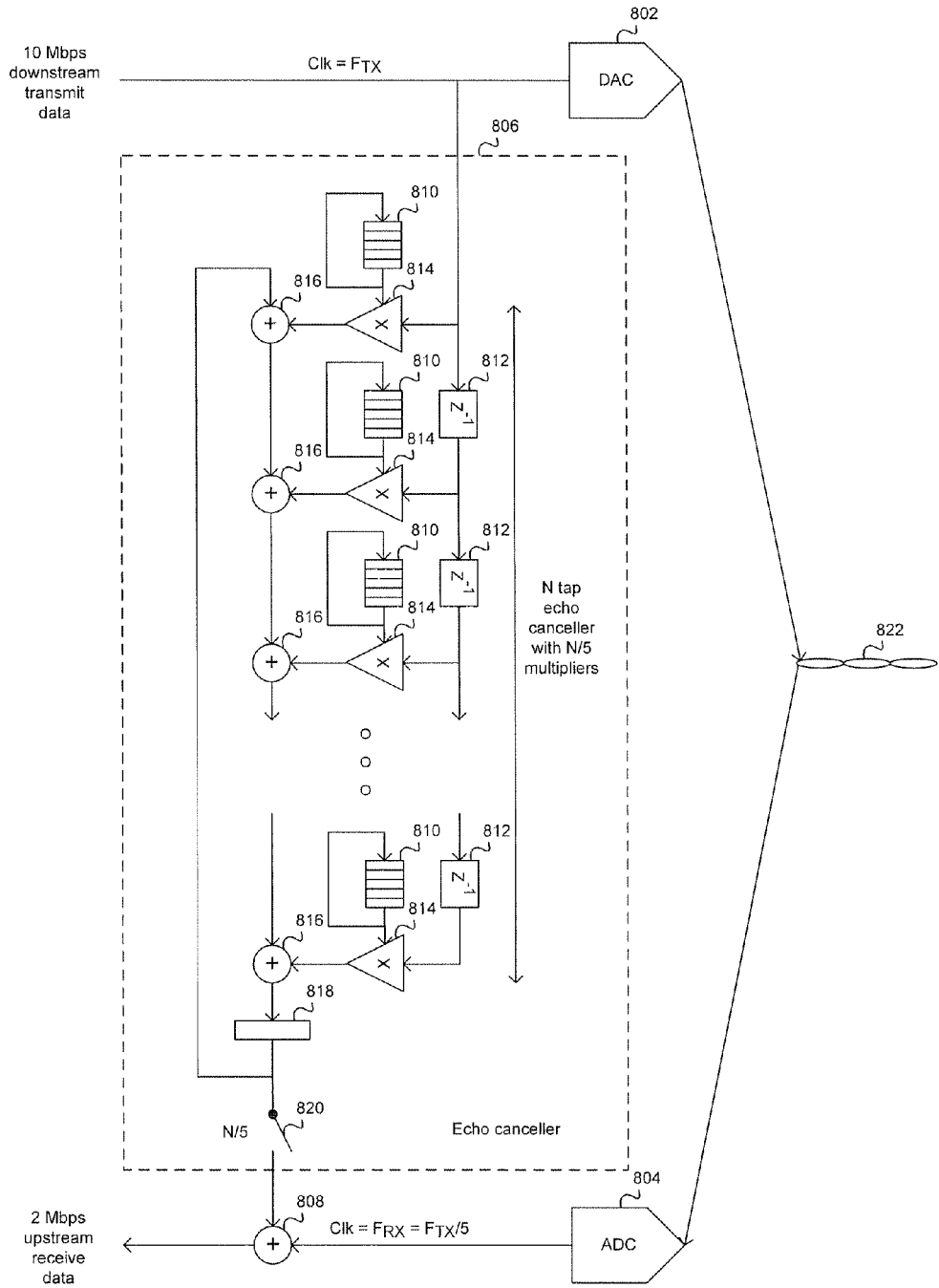
FIG. 8 is a block diagram of an exemplary echo canceller in an upstream asymmetric multi-rate PHY with a 10 Mbps downstream data rate and a 2 Mbps upstream data rate, in connection with an embodiment of the invention.

FIG. 8 is a block diagram of an exemplary echo canceller in an upstream asymmetric multi-rate PHY with a 10 Mbps downstream data rate and a 2 Mbps upstream data rate, in connection with an embodiment of the invention. Referring to FIG. 8, there is shown an echo canceller 806 in a portion of an asymmetric multi-rate transceiver in an upstream link partner that is utilized in a mode of operation that supports 10 Mbps downstream data rate and 2 Mbps upstream data rate. The echo canceller 806 may be implemented utilizing an N tap echo canceller architecture that utilizes N/5 multipliers, for example. In this regard, the echo canceller 806 may utilize a plurality of registers 810, a plurality of multipliers 814, a plurality of delay taps 812, a plurality of adders 816, an output register 818, and a switch 820.

The echo canceller 806 may utilize a digital downstream signal that is based on a transmission clock, $F_{TX}$, to generate an output signal via the switch 820 to be communicated to an adder 808, where the output signal is based on a receive clock, $F_{RX}=F_{TX}/5$. The digital downstream signal may be converted to an analog downstream signal by the digital-to-analog converter (DAC) 802 for transmission via a twisted-pair copper wire 822. An analog upstream signal may be received by an analog-to-digital converter (ADC) 804 for conversion to a digital upstream signal in the upstream link partner. The digital upstream signal and the output signal generated by the echo canceller 806 may be added in the adder 808 to reduce the ECHO component in the received digital upstream signal.

Figure 9:
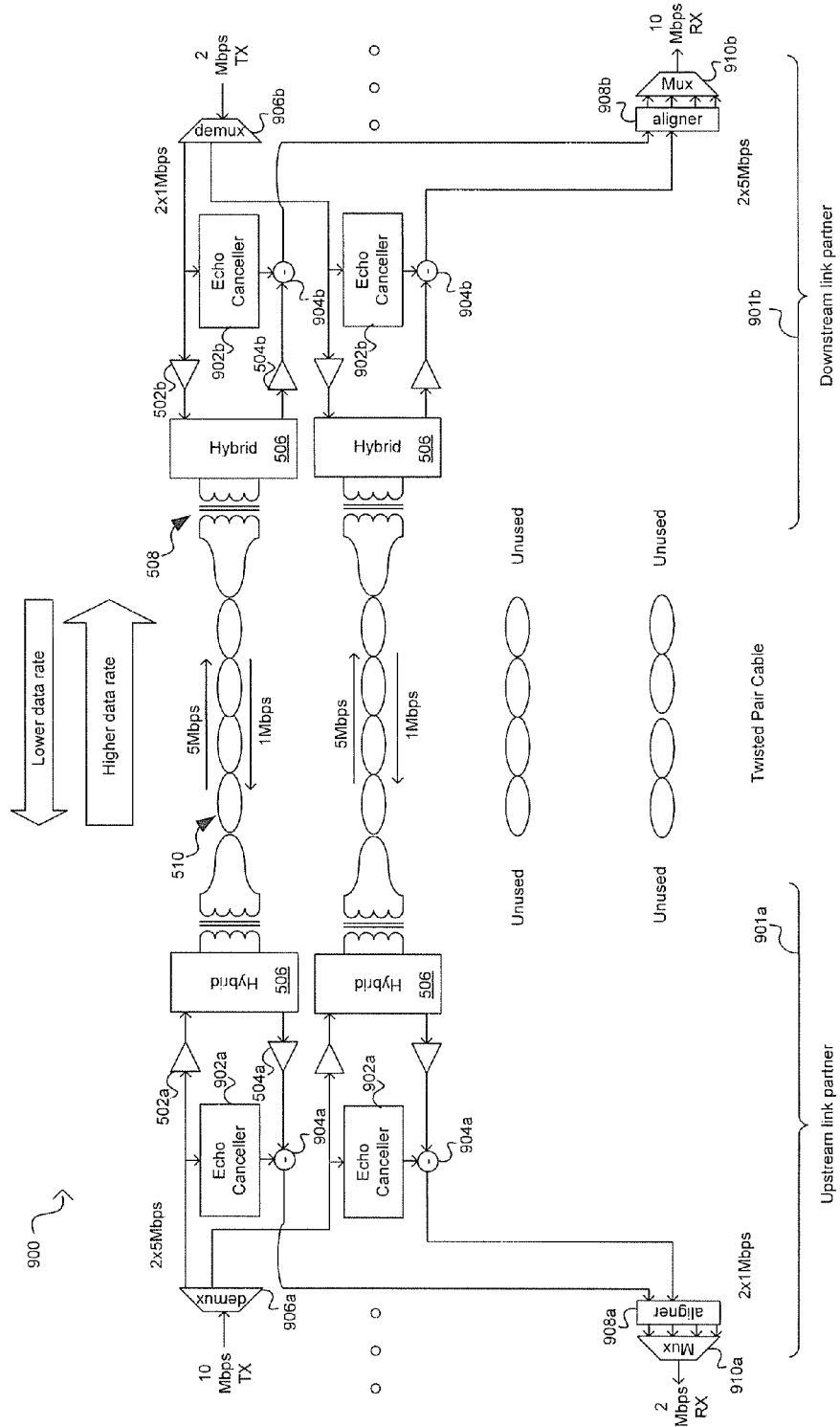
FIG. 9 is a block diagram of a multi-rate Ethernet system for asymmetric data traffic that utilizes Gigabit signal processing resources in a two-pair extended range mode, in accordance with an embodiment of the invention.

FIG. 9 is a block diagram of a multi-rate Ethernet system for asymmetric data traffic that utilizes Gigabit signal processing resources in a two-pair extended range mode, in accordance with an embodiment of the invention. Referring to FIG. 9, there is shown an asymmetric multi-rate Ethernet system 900 that may comprise an upstream link partner 901a and a downstream link partner 901b. The asymmetric multi-rate Ethernet system 900 may support up to 1 Gbps or 10 Gbps of asymmetric data traffic, for example. The asymmetric multi-rate Ethernet system 900 may also support other modes of operation, such as a lower asymmetric transmission rate over two-pair twisted-pair wire. In this regard, the asymmetric multi-rate Ethernet system 900 may support a lower communication rate, such as 10 Mbps downstream data rate and 2 Mbps upstream data rate, while utilizing the signal processing operations available in the asymmetric multi-rate PHY layer for processing the higher communication rate, such as 1 Gbps or 10 Gbps when available.

The upstream link partner 901a and the downstream link partner 901b may communicate via two twisted-pair wires 510 in full duplex operation at 5 Mbps downstream data rate at each wire to provide an aggregate downstream data rate of 10 Mbps and at 1 Mbps upstream data rate at each wire to provide an aggregate upstream data rate of 2 Mbps. The upstream link partner 901a may utilize two hybrids 506 with corresponding echo canceller 902a and a subtractor 904a. The upstream link partner 901a may also utilize a demux 906a, an aligner 908a, and a mux 910a for transmission and reception of signals at the reduced asymmetric communication rate. Similarly, the downstream link partner 901b may utilize two hybrids 506 with corresponding echo canceller 902b and a subtractor 904b. The downstream link partner 901b may also utilize a demux 906b, an aligner 908b, and a mux 910b for transmission and reception of signals at the reduced asymmetric communication rate. The two remaining twisted-pair wires may remain unused in the asymmetric multi-rate Ethernet system 900.

The asymmetric multi-rate Ethernet system 900 need not be limited to achieving a lower asymmetric communication rate by evenly distributing the data rate over each of the two twisted-pair wires utilized. In another embodiment of the invention, the asymmetric multi-rate Ethernet system 800 may achieve a lower communication rate by distributing the upstream and downstream data rates unevenly over each of the two twisted-pair wires utilized. For example, the first twisted-pair wire may support a 4 Mbps downstream data rate while the second twisted-pair wire may support 6 Mbps downstream data rate, to achieve an aggregate of 10 Mbps. Similarly, the first twisted-pair wire may support a 800 kbps upstream data rate while the second twisted-pair wire may support 1.2 Mbps upstream data rate, to achieve an aggregate of 2 Mbps In this regard, the components in the upstream link partner 901a and/or the downstream link partner 901b may be adapted to handle an unevenly distributed lower communication rate with asymmetric data traffic.

Figure 10:
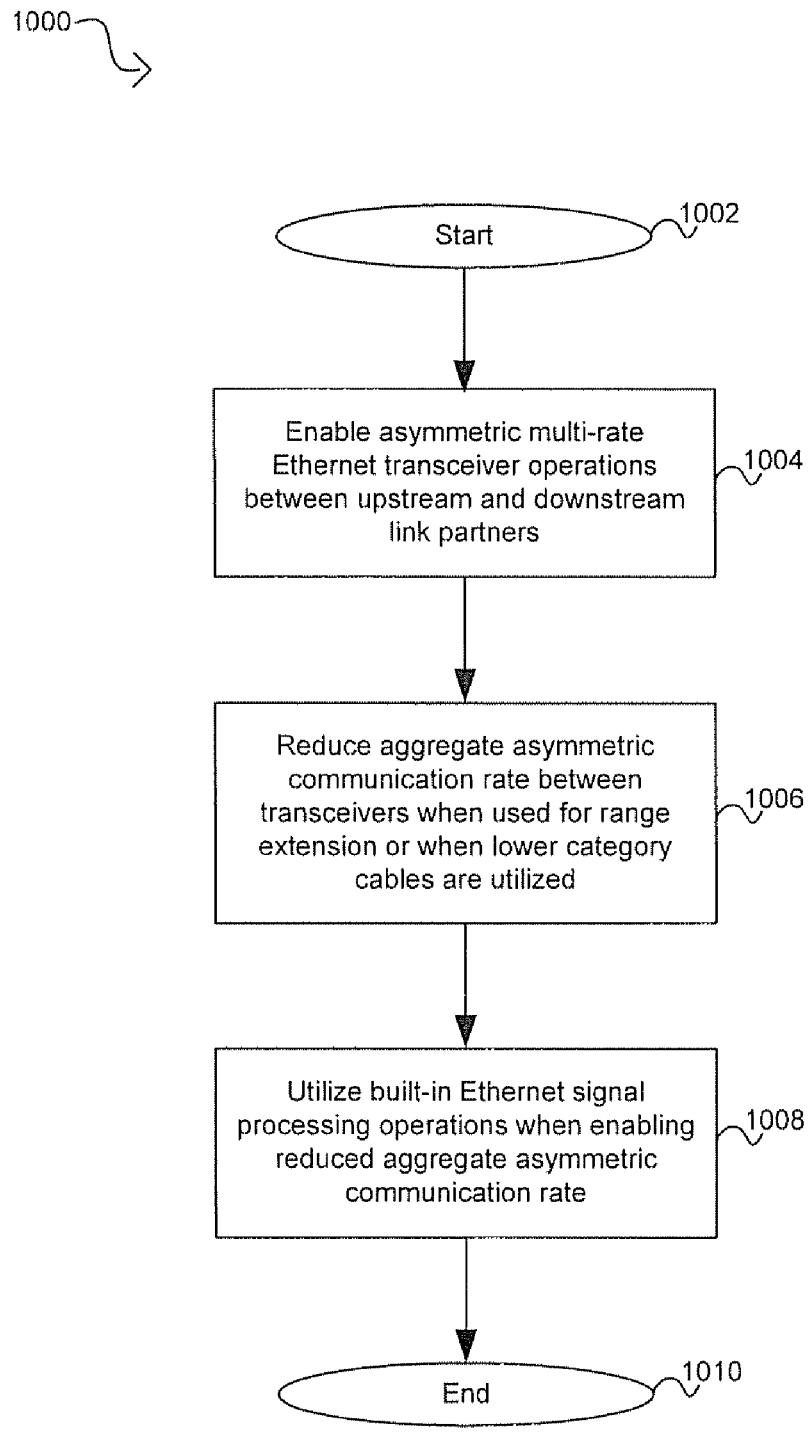
FIG. 10 is a flow diagram illustrating exemplary steps in communication rate reduction to achieve extended range in Ethernet systems that utilize asymmetric multi-rate PHYs, in accordance with an embodiment of the invention.

FIG. 10 is a flow diagram illustrating exemplary steps in communication rate reduction to achieve extended range in Ethernet systems that utilize asymmetric multi-rate PHYs, in accordance with an embodiment of the invention. Referring to FIG. 10, there is shown a flow diagram 1000. After start step 1002, in step 1004, an asymmetric Gigabit Ethernet transceiver may be enabled. The Gigabit Ethernet transceiver may utilize an asymmetric multi-rate PHY layer that enables reducing the communication rate from, for example, 1 Gbps to a lower communication rate. The lower communication rate may be a 10 Mbps downstream data rate and a 2 Mbps upstream data rate, for example, but need not be so limited. The asymmetric multi-rate PHY layer may also enable reduction of the symbol rate for the asymmetric Gigabit Ethernet transceiver. When reducing the communication rate or symbol rate, the asymmetric multi-rate PHY layer enables the application of Gigabit signal processing operations to the reduced communication or symbol rate.

In step 1006, an extended range mode may be enabled in the asymmetric Gigabit Ethernet transceiver whereby the asymmetric multi-rate PHY layer reduces the communication rate and/or the symbol rate in at least one of the communication directions. In step 1008, at least a portion of the asymmetric Gigabit signal processing operations available in the asymmetric multi-rate PHY layer may be utilized during the extended range mode to enable the use of longer cables or to enable the use of higher insertion loss cables at the standard length. After step 1008, the process may proceed to end step 1010.

Various embodiments of the invention may be utilized to extend a range of asymmetric multi-rate PHYs in Ethernet transceivers, such as <10 Mpbs, 10 Mbps, 100 Mbps, and 1000 Mbps, for example. The same techniques may also be utilized to extend the range of any arbitrary rate. Applications for extending the range of asymmetric multi-rate Ethernet PHYs may comprise: backhaul, multi-tenant unit (MTU) FTTX+LAN, VDSL replacement, and/or generally networks that utilize switches, hubs, and/or repeaters to extend the distance of a point-to-point connection to greater than 100 meters. Moreover asymmetric multi-rate PHYs in Ethernet transceivers on both ends of an asymmetric Ethernet link may differ in speeds, error correction coding, equalization complexity, crosstalk cancellation complexity, and/or line code, for example.

An asymmetric Ethernet transceiver that supports extended range via its asymmetric PHY layer operations may facilitate the elimination of switches used purely as network extenders, thereby saving on cost. In addition, single pair operation may be utilized to replace DSL equipment with less expensive Ethernet equipment. In accordance with various embodiments of the invention, various features for extended range may be built into an asymmetric Gigabit PHY layer architecture with minimal overhead. This permits extended ranges applications to enjoy the cost reduction possible with a high volume part.

In an embodiment of the invention, a machine-readable storage having stored thereon, a computer program having at least one code section for wired communication, the at least one code section being executable by a machine for causing the machine to perform steps comprising reducing a communication rate of an asymmetric multi-rate PHY from a higher communication rate to a lower communication rate, and applying signal processing operations supported by the asymmetric multi-rate PHY associated with the higher communication rate to the lower communication rate. The asymmetric multi-rate PHY may be an asymmetric Ethernet multi-rate PHY. The machine-readable storage may comprise code for distributing the reduced communication rate over an upstream portion and/or a downstream portion of the lower communication rate.

The machine-readable storage may comprise code for aggregating an upstream portion of the lower communication rate by evenly distributing the upstream portion over each twisted-pair wire utilized in a copper cabling. The machine-readable storage may comprise code for aggregating a downstream portion of the lower communication rate by evenly distributing the downstream portion over each twisted-pair wire utilized in a copper cabling. The machine-readable storage may comprise code for aggregating an upstream portion of the lower communication rate by unevenly distributing the upstream portion over each twisted-pair wire utilized in a copper cabling. The machine-readable storage may comprise code for aggregating a downstream portion of the lower communication rate by unevenly distributing the downstream portion over each twisted-pair wire utilized in a copper cabling.

The machine-readable storage may comprise code for reducing the communication rate from a higher symbol rate to a lower symbol rate. The signal processing operations associated with the higher communication rate comprise at least one of an ECHO cancellation operation, a NEXT cancellation operation, and a FEXT cancellation operations. The signal processing operations associated with the higher communication rate comprise equalization operations.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wired communication, the method comprising:
   in a multi-rate Ethernet physical layer device operable to communicate over a wired communication medium comprising a plurality of twisted-pairs utilizing Ethernet physical layer standards and/or protocols:
   controlling a transmission rate at which said multi-rate Ethernet physical layer device transmits data over said wired communication medium;
   controlling a reception rate at which said multi-rate Ethernet physical layer device receives data over said wired communication medium;
   selecting fewer signal processing operations to be utilized on each twisted-pair of said plurality of twisted-pairs of said wired communication medium by said multi-rate Ethernet physical layer device to receive data than to transmit data over said wired communication medium when said reception rate is lower than said transmission rate;
   wherein said signal processing operations comprise one or more of an ECHO cancellation operation, a near-end crosstalk (NEXT) cancellation operation, and a far-end crosstalk (FEXT) cancellation operation.

2. The method according to claim 1, comprising evenly distributing transmitted data among said plurality of twisted-pairs in said wired communication medium.

3. The method according to claim 1, wherein data received over said wired communication medium is evenly distributed among said plurality of twisted-pairs in said wired communication medium.

4. The method according to claim 1, comprising unevenly distributing transmitted data among said plurality of twisted-pairs in said wired communication medium.

5. The method according to claim 1, wherein data received over said wired communication medium is unevenly distributed among said plurality of twisted-pairs in said wired communication medium.

6. The method according to claim 1, comprising controlling one or both of said transmission rate and said reception rate by controlling a symbol rate.

7. The method according to claim 1, wherein said signal processing operations comprise equalization operations.

8. The method according to claim 1, comprising controlling one or both of said transmission rate and said reception rate based on an insertion loss of said wired communication medium.

9. A non-transitory computer-readable medium having stored thereon, a computer program having at least one code section for wired communication, the at least one code section being executable by a computer for causing the computer to perform steps comprising:
   in a multi-rate Ethernet physical layer device operable to communicate over a wired communication channel comprising a plurality of twisted-pairs utilizing Ethernet physical layer standards and/or protocols:
   controlling a transmission rate at which said multi-rate Ethernet physical layer device transmits data over said wired communication medium;
   controlling a reception rate at which said multi-rate Ethernet physical layer device receives data over said wired communication medium;
   selecting fewer signal processing operations to be utilized on each twisted-pair of said plurality of twisted-pairs of said wired communication medium by said multi-rate Ethernet physical layer device to receive data than to transmit data over said wired communication medium when said reception rate is lower than said transmission rate;
   wherein said signal processing operations comprise one or more of an ECHO cancellation operation, a near-end crosstalk (NEXT) cancellation operation, and a far-end crosstalk (FEXT) cancellation operation.

10. The non-transitory computer-readable medium according to claim 9, comprising code for evenly distributing transmitted data among said plurality of twisted-pairs in said wired communication medium.

11. The non-transitory computer-readable medium according to claim 9, wherein data received over said wired communication medium is evenly distributed among said plurality of twisted-pairs in said wired communication medium.

12. The non-transitory computer-readable medium according to claim 9, comprising code for unevenly distributing transmitted data among said plurality of twisted-pairs in said wired communication medium.

13. The non-transitory computer-readable medium according to claim 9, comprising code for wherein data received over said wired communication medium is unevenly distributed among said plurality of twisted-pairs in said wired communication medium.

14. The non-transitory computer-readable medium according to claim 9, comprising code for controlling one or both of said transmission rate and said reception rate by controlling a symbol rate.

15. The non-transitory computer-readable medium according to claim 9, wherein said signal processing operations comprise equalization operations.

16. A system for wired communication, the system comprising:
   one or more circuits for use in a multi-rate Ethernet physical layer device operable to communicate over a wired communication medium comprising a plurality of twisted-pairs utilizing Ethernet physical layer standards and/or protocols, said one or more circuits being operable to:
   control a transmission rate at which said multi-rate Ethernet physical layer device transmits data over said wired communication medium;
   control a reception rate at which said multi-rate Ethernet physical layer device receives data over said wired communication medium;
   select fewer signal processing operations to be utilized on each twisted-pair of said plurality of twisted-pairs of said wired communication medium by said multi-rate Ethernet physical layer device to receive data than to transmit data over said wired communication medium when said reception rate is lower than said transmission rate;

wherein said signal processing operations comprise one or more of an ECHO cancellation operation, a near-end crosstalk (NEXT) cancellation operation, and a far-end crosstalk (FEXT) cancellation operation.

17. The system according to claim 16, wherein said one or more circuits are operable to evenly distribute transmitted data among said plurality of twisted-pairs in said wired communication medium.

18. The system according to claim 16, wherein data received over said wired communication medium is evenly distributed among said plurality of twisted-pairs in said wired communication medium.

19. The system according to claim 16, wherein said one or more circuits are operable to unevenly distribute transmitted data among said plurality of twisted-pairs in said weird communication medium.

20. The system according to claim 16, wherein data received over said wired communication medium is unevenly distributed among said plurality of twisted-pairs in said wired communication medium.

21. The system according to claim 16, wherein said one or more circuits are operable to control one or both of said transmission rate and said reception rate by controlling a symbol rate.

22. The system according to claim 16, wherein said signal processing operations comprise equalization operations.

23. The system according to claim 16, wherein said one or more circuits are operable to: control one or both of said transmission rate and said reception rate based on an insertion loss of said wired communication medium.

24. A method comprising:
performing by one or more circuits in an Ethernet physical layer device, said one or more circuits being operable to perform a plurality of signal processing operations, and communicate over a wired communication medium comprising a plurality of twisted-pairs utilizing Ethernet physical layer standards and/or protocols:
transmitting baseband signals over said wired communication medium at a first data rate;
receiving baseband signals over said wired communication medium at a second data rate;
independently controlling each of said first data rate and said second data rate;
selecting, during operation of said multi-rate Ethernet physical layer device, fewer of said plurality of signal processing operations to utilize on each twisted-pair of said plurality of twisted-pairs of said wired communication medium for processing said received baseband signals when said second data rate is lower than said first data rate;
wherein said signal processing operations comprise one or more of an ECHO cancellation operation, a near-end crosstalk (NEXT) cancellation operation, and a far-end crosstalk (FEXT) cancellation operation.

25. The method according to claim 24, comprising evenly distributing said transmitted baseband signals among said plurality of twisted-pairs in said wired communication medium.

26. The method according to claim 24, wherein said received baseband signals are evenly distributed among said plurality of twisted-pairs in said wired communication medium.

27. The method according to claim 24, comprising unevenly distributing said transmitted baseband signals among said plurality of twisted-pairs in said wired communication medium.

28. The method according to claim 24, wherein said received baseband signals are unevenly distributed among said plurality of twisted-pairs in said wired communication medium.

29. The method according to claim 24, wherein said selecting is based on a length of said wired communication medium.

30. The method according to claim 24, wherein said selecting is based on an insertion loss of said wired communication medium.

31. A system comprising:
one or more circuits that are operable to:
perform a plurality of signal processing operations;
communicate over a wired communication medium comprising a plurality of twisted-pairs utilizing Ethernet physical layer standards and/or protocols;
transmit baseband signals over said wired communication medium at a first data rate;
receive baseband signals over said wired communication medium at a second data rate;
independently control each of said first data rate and said second data rate; and
select, during operation of said multi-rate Ethernet physical layer device, fewer of said plurality of signal processing operations to be utilized on each twisted-pair of said plurality of twisted-pairs of said wired communication medium for processing said received baseband signals when said second data rate is lower than said first data rate;
wherein said signal processing operations comprise one or more of an ECHO cancellation operation, a near-end crosstalk (NEXT) cancellation operation, and a far-end crosstalk (FEXT) cancellation operation.

32. The system according to claim 31, wherein said one or more circuits are operable to evenly distribute said transmitted baseband signals among said plurality of twisted-pairs in said wired communication medium.

33. The system according to claim 31, wherein said received baseband signals are evenly distributed among said plurality of twisted-pairs in said wired communication medium.

34. The system according to claim 31, wherein said one or more circuits are operable to unevenly distribute said transmitted baseband signals among said plurality of twisted-pairs in said wired communication medium.

35. The system according to claim 31, wherein said received baseband signals are unevenly distributed among said plurality of twisted-pairs in said wired communication medium.

36. The system according to claim 31, wherein said selecting is based on a length of said communication medium.

37. The system according to claim 31, wherein said selection is based on an insertion loss of said wired communication medium.

* * * * *